(12) United States Patent
Abdulkhair et al.

(10) Patent No.: US 12,492,123 B1
(45) Date of Patent: *Dec. 9, 2025

(54) NANOCOMPOSITE FOR HYDROGEN GENERATION

(71) Applicant: IMAM MOHAMMAD IBN SAUD ISLAMIC UNIVERSITY, Riyadh (SA)

(72) Inventors: Babiker Yagoub Elhadi Abdulkhair, Riyadh (SA); Mohamed Khairy Omran, Riyadh (SA); Mohamed Nady Abd El-Hameed Ibrahim, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/062,378

(22) Filed: Feb. 25, 2025

(51) Int. Cl.
| | | |
|---|---|---|
| *C01B 3/02* | (2006.01) | |
| *B01J 21/04* | (2006.01) | |
| *B01J 23/88* | (2006.01) | |
| *B01J 27/20* | (2006.01) | |
| *B01J 27/24* | (2006.01) | |

(Continued)

(52) U.S. Cl.
CPC .............. *C01B 3/065* (2013.01); *B01J 21/04* (2013.01); *B01J 23/88* (2013.01); *B01J 27/20* (2013.01); *B01J 27/24* (2013.01); *B01J 35/19* (2024.01); *B01J 35/45* (2024.01); *B01J 35/612* (2024.01); *B01J 35/613* (2024.01); *B01J 35/633* (2024.01); *B01J 35/647* (2024.01); *B01J 35/67* (2024.01); *B01J 2235/15* (2024.01); *B01J 2235/30* (2024.01); *B82Y 30/00* (2013.01);

(Continued)

(58) Field of Classification Search
CPC ... B01J 21/04; B01J 23/88; B01J 27/20; B01J 27/24; C01B 3/02; C01B 3/065
USPC .................................. 423/648.1; 252/188.25
See application file for complete search history.

(56) References Cited

U.S. PATENT DOCUMENTS

| 12,275,655 B1 * | 4/2025 | Abdulkhair .......... B01J 20/2808 |
| 12,286,349 B1 * | 4/2025 | Abdulkhair .......... B01J 37/0036 |
| 2010/0178240 A1 * | 7/2010 | Capron ................. H01M 8/065 |
| | | 977/773 |

FOREIGN PATENT DOCUMENTS

| CN | 110577189 B | 1/2023 |
| CN | 114177928 B | 10/2023 |

(Continued)

OTHER PUBLICATIONS

Alaghmandfard (A Comprehensive Review of Graphitic Carbon Nitride (g-C3N4)-Metal Oxide-Based Nanocomposites: Potential for Photocatalysis and Sensing, Nanomaterials 2022, 12, 294, https://doi.org/10.3390/nano12020294).*

(Continued)

*Primary Examiner* — Jun Li
(74) *Attorney, Agent, or Firm* — Oblon, McClelland, Maier & Neustadt, L.L.P.

(57) ABSTRACT

A method of hydrogen generation may include contacting sodium borohydride ($NaBH_4$) and water in the presence of a catalyst including a nanocomposite comprising graphitic $C_3N_4$, $MoO_3$, and $MgAl_2O_4$ in a mass relationship to each other in a range of from 5 to 15:2 to 7:75 to 95, at a temperature in a range of from 10 to 80° C., thereby catalyzing the hydrogen generation at a hydrogen generation rate in a range of from 2750 to 6000 mL/(min·g).

19 Claims, 6 Drawing Sheets

(51) Int. Cl.
  *B01J 35/00* (2006.01)
  *B01J 35/45* (2024.01)
  *B01J 35/61* (2024.01)
  *B01J 35/63* (2024.01)
  *B01J 35/64* (2024.01)
  *B01J 35/67* (2024.01)
  *C01B 3/06* (2006.01)
  *B82Y 30/00* (2011.01)

(52) U.S. Cl.
  CPC ............ *C01B 2203/1005* (2013.01); *C01B 2203/1041* (2013.01); *C01B 2203/1614* (2013.01)

(56) References Cited

FOREIGN PATENT DOCUMENTS

| CN | 118022811 A | | 5/2024 | |
|----|-------------|---|--------|---|
| CN | 118437373 A | * | 8/2024 | ............ B01J 27/24 |
| CN | 119332276 A | * | 1/2025 | ............ C25B 1/04 |
| KR | 10-2631898 B1 | | 1/2024 | |

OTHER PUBLICATIONS

He et al. (Enhanced photocatalytic hydrogen production over Co3O4@g-C3N4 p-n junction adhering on one-dimensional carbon fiber, Colloids and Surfaces A 586 (2020) 124200).*

Ahmad et al. (Construction of g-C3N4/WO3/MoS2 ternary nanocomposite with enhanced charge separation and collection for efficient wastewater treatment under visible light, A. Beyhaqi et al. / Chemosphere 247 (2020) 125784).*

Gamba et al , CoMo/g-C3N4 as a highly effective, reusable, non-noble metal-based catalyst for H2 production via NaBH4 hydrolysis focused on stationary application under mild conditions: A kinetic study, International Journal of Hydrogen Energy 86 (2024) 777-787.*

Alhulw H. Alshammari, et al.. "MoO3/S@g-C3N4 Nanocomposite Structures: Synthesis, Characterization, and Hydrogen Catalytic Performance", Nanomaterials, vol. 13, No. 5, 820, Feb. 23, 2023, 15 pages.

* cited by examiner

NANOCOMPOSITE FOR HYDROGEN GENERATION

BACKGROUND

Technical Field

The present disclosure is directed towards nanohybrids for hydrogen generation, and more particularly, relates to a method of hydrogen generation using g-$C_3N_4$, $MoO_3$, and $MgAl_2O_4$.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

In recent years, tremendous industrialization and population increases have led to a search for alternate energy sources to meet the expanding energy demand. Primarily, the depletion of non-renewable energy resources and environmental concerns compel societies to switch to clean, renewable energy sources soon. Although generating energy from the sun is cheap, the storage of this energy costs money because people have to rely on battery storage, which can be replaced repeatedly, is expensive, and is difficult to dispose of safely. On the other hand, hydrogen energy is cleaner and has several advantages over battery systems: it's 100% clean, has extended life storage, and unlimited production and storage. Hydrogen energy has several advantages over batteries when saving energy and powering various applications. Here are some key benefits, including the fact that $H_2$ has a higher energy density than most batteries, meaning it can store more energy in a smaller volume, making it ideal for applications like transportation, where weight and space are critical. Refueling a hydrogen vehicle can take just a few minutes, similar to traditional gasoline vehicles, whereas charging batteries can take much longer. $H_2$ fuel cells can provide longer ranges than battery electric vehicles, making them suitable for heavy-duty applications and long-distance travel. Further, they are lighter than the equivalent battery systems for large-scale applications, such as trucks or ships, which is crucial for efficiency and payload capacity. $H_2$ production can be scaled up from renewable sources (like electrolysis using solar or wind power), potentially leading to sustainable and large-scale energy storage solutions. Unlike batteries, which degrade over time and require replacement, hydrogen systems can maintain performance over a longer lifespan with proper maintenance. Also, $H_2$ can be used in various sectors beyond transportation, such as industrial processes, heating, and energy storage, providing versatility in energy solutions. Hydrogen can store excess renewable energy for long periods, helping to balance supply and demand in the energy grid. Further, hydrogen can offer a clean energy alternative when produced from renewable sources, emitting only water vapor when used in fuel cells, and can help stabilize the electrical grid by acting as a flexible energy storage solution, absorbing excess energy during peak production times. While hydrogen energy has significant advantages, it's essential to consider the challenges, such as production costs, infrastructure, and energy conversion efficiency; however, its potential for a sustainable energy future is promising.

Accordingly, one object of the present disclosure is to provide an efficient method for hydrogen generation using a nanocomposite catalyst that may circumvent the drawbacks and limitations, such as high cost, high lead times, low efficiency, and poor environmental performance of methods and materials known in the art.

SUMMARY

In an exemplary embodiment, a method of hydrogen generation is described. The method may include contacting sodium borohydride ($NaBH_4$) and water in the presence of a catalyst comprising a nanocomposite comprising graphitic $C_3N_4$, $MoO_3$, and $MgAl_2O_4$ in a mass relationship to each other in a range of from 5 to 15:2 to 7:75 to 95, at a temperature in a range of from 10 to 80° C., thereby catalyzing the hydrogen generation at a hydrogen generation rate in a range of from 2750 to 6000 mL/(min·g). The borohydride may be hydrolyzed under such circumstances to create $H_2$.

The average pore distribution of the nanocomposite may be unimodal, and wherein a BET specific surface area of the nanocomposite is in a range of from 8 to 12 $m^2/g$ (10.1 $m^2/g$), and/or wherein an average pore diameter of the nanocomposite, according to BJH measurement method, may be in a range of from 5 to 15 nm (8.34 nm), and/or wherein an average pore volume of the nanocomposite, according to the BJH measurement method, may be in a range of from 0.01 to 0.5 $cm^3/g$ (0.033 $cm^3/g$).

The nanocomposite may have a (311) spinel interplanar spacing in a range of from 0.205 to 0.285 nm, (411) $MoO_3$ interplanar spacing in a range of from 0.150 to 0.230 nm, (511) spinel interplanar spacing in a range of from 0.115 to 0.195 nm, (311) MgO interplanar spacing in a range of from 0.087 to 0.167 nm, (622) spinel interplanar spacing in a range of from 0.080 to 0.160 nm, according to selected area diffraction.

The mass relationship of the nanocomposite may be in a range of from 9 to 11:4 to 6:84 to 86, wherein the nanocomposite has a (311) spinel interplanar spacing of 0.245±2% nm, (411) $MoO_3$ interplanar spacing of 0.19±2% nm, (511) spinel interplanar spacing of 0.155±2% nm, (311) MgO interplanar spacing of 0.127±2% nm, (622) spinel interplanar spacing of 0.12±2% nm, according to selected area diffraction, wherein an XRD spectrum of the nanocomposite under Cu-filtered CuKα radiation (1.5418 Å) powered at 45 kV and 10 mA has 2θ peaks of an $MoO_3$ hexagonal phase at 18.7±1, 28.7±1, 33.0±1, 33.8±1, 36.8±1, and 42.8±1°, an $MgAl_2O_4$ spinel phase at 19.3±1, 36.8±1, 44.6±1, 59.3±1, and 65.01±1°, an MgO cubic phase at 42.8±1, 62.2±1, and 74.6±1°, g-$C_3N_4$-related diffractions at 27.8±1, 36.8±1, 44.6±1, and 59.3±1°, and wherein no more than 1% relative intensity $Al_2O_3$ is detected in the XRD spectrum.

The high hydrogen generation rate in the contacting the nanocomposite and the sodium borohydride may be in a range of from 3750 to 5250 mL/(min·g) [4000 mL/(min·g)], and wherein the hydrogen generation rate in the contacting is in a range of from 2 to 8-fold that without the nanocomposite.

The nanocomposite may comprise no more than 1 wt. % $MoS_2$ and/or $SnS_2$, and/or no sulfide.

The nanocomposite may comprise no more than 0.1 wt. % of Bi.

The nanocomposite may comprise less than 0.1 wt. % Co, relative to total nanocomposite weight.

The nanocomposite may comprise no added Co (only inevitable traces), and/or wherein the nanocomposite may comprise no more than 1 wt. % tin.

The nanocomposite may comprise no more than 1 wt. % potassium and/or zinc.

The nanocomposite may comprise no more than 1 wt. % iron and/or nickel.

The nanocomposite may comprise no more than 1 wt. % Mo (IV), and/or the nanocomposite obtained may include at least 99 wt. % Mo (VI).

The nanocomposite may comprise no more than 1 wt. % carbonaceous material besides the graphitic carbon nitride, and/or the nanocomposite may include no more than 5 wt. % graphene, relative to all carbonaceous material in the nanocomposite.

The nanocomposite may have a structure comprising a dispersion of homogeneous spherical metal oxides nanoparticles on a two-dimensional porous structure nanosheets and platelets of the g-$C_3N_4$.

The nanocomposite may comprise no bismuth.

The nanocomposite may comprise no more than 1 wt. % of iron, cobalt, nickel, and/or copper.

The nanocomposite may comprise no more than 0.5 wt. % of elemental metal.

The nanosheets may be curled and/or wrinkled.

The nanocomposite may comprise no more than 1 wt. % $Ba(OH)_2$.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
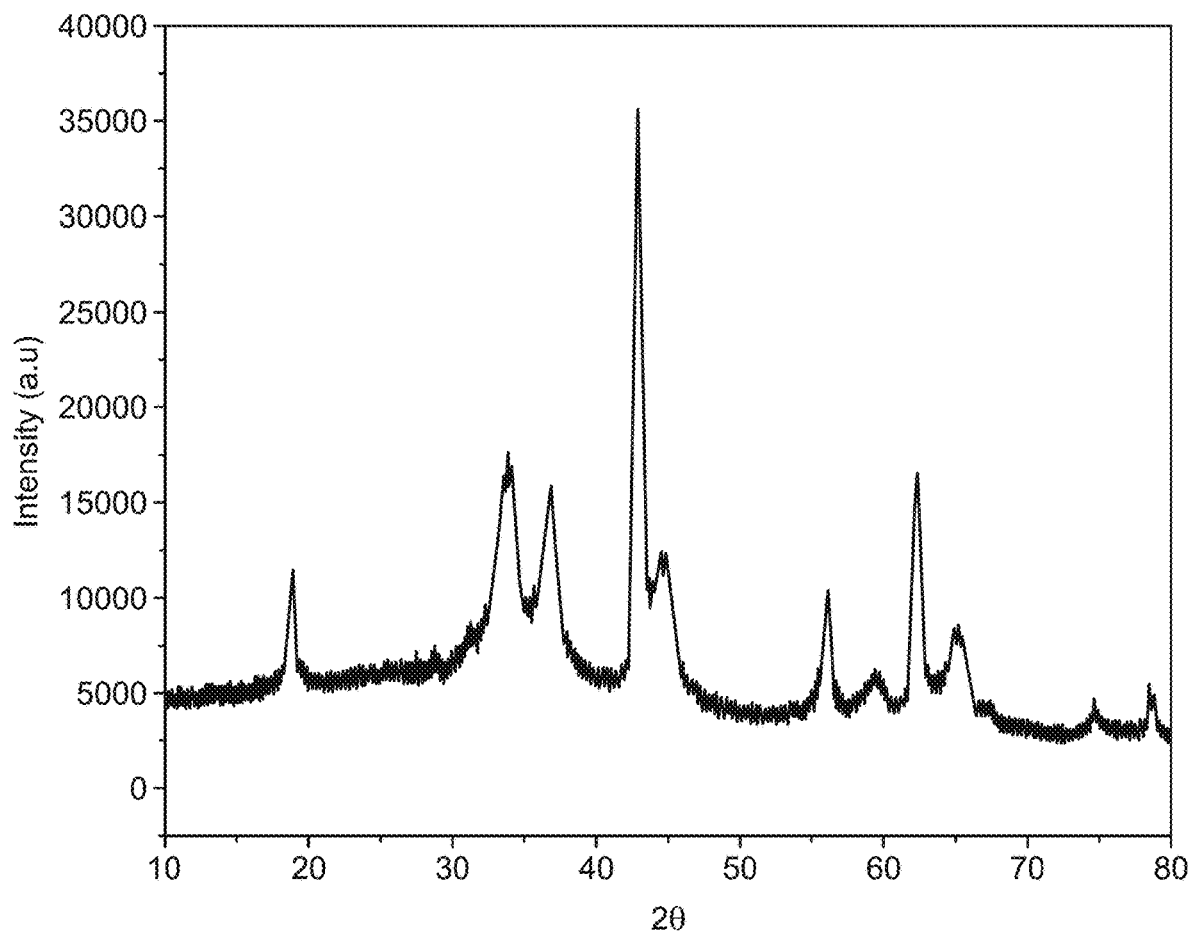
FIG. 1 is a graph depicting X-ray diffraction (XRD) patterns of an inventive 10% g-$C_3N_4$@$MoO_3$/$MgAl_2O_4$ nanocomposite.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 500 nm within the scope of the present invention.

As used herein, the term 'nanocomposite' refers to a composite material that has at least one component with a grain size measured in nanometers.

As used herein, the term 'nanohybrid composite' refers to a material that combines nanomaterials (such as nanoparticles, nanotubes, or nanofibers) with another material, typically a polymer, metal, or ceramic, to form a composite structure. The nanomaterials are typically incorporated at the nanoscale level to enhance the properties of the base material, such as improving strength, conductivity, or flexibility, while maintaining the advantages of both components. The resulting nanohybrid composite exhibits unique properties that are superior to the individual materials alone.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a key parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is an important parameter in characterizing the porous structure of materials, such as adsorbents or catalysts.

As used herein, the term 'unimodal' refers to a distribution or pattern that has a single peak or mode. In the context of particle size or material properties, it indicates that the sample consists of particles or components that are primarily of one size or characteristic, rather than varying widely in size or composition.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed toward a g-$C_3N_4$@$MoO_3$/$MgAl_2O_4$ (10:5:85, wt. %) nanocomposite designed to function as a catalyst to enhance the hydrolysis of sodium borohydride ($NaBH_4$), e.g., in water for efficient production of hydrogen gas. The catalyst facilitates the safe and rapid release of hydrogen from $NaBH_4$, making it an efficient solution for clean hydrogen production. The present disclosure circumvents the drawbacks of prior art by addressing key limitations such as high catalyst costs, slow reaction rates, and environmental concerns. Traditional catalysts often require expensive materials and result in inefficient or slow hydrogen production. In contrast, the present disclosure uses a cost-effective catalyst that promotes faster hydrogen generation without relying on toxic or scarce materials. The simplicity of its preparation and its high catalytic activity also ensure scalability and practical applicability, without needing to apply potential or use electrodes, making it a more efficient and sustainable alternative to existing methods.

A nanocomposite may include graphitic $C_3N_4$, $MoO_3$, and $MgAl_2O_4$. The mass relationship of graphitic $C_3N_4$, $MoO_3$, and $MgAl_2O_4$ in the nanocomposite may be in a range of from 5 to 15:2 to 7:75 to 95, preferably 6 to 10:3 to 6:80 to 90, preferably 9 to 11:4 to 6:84 to 86, and more preferably 10:5:85, while tolerable variations of any of these values may be ±2.5, 2, 1.5, 1, 0.75, 0.5, 0.25, 0.1, 0.5, or 0.1. When each component of the nanocomposite is used in desired weight ratios, the nanocomposite exhibits excellent performance in energy production.

The nanocomposite may contain g-$C_3N_4$ in an amount ranging from 5 to 15 wt. %, including 5 to 7 wt. %, 7 to 9 wt. %, 9 to 11 wt. %, 11 to 13 wt. %, and 13 to 15 wt. % based on the total weight of the nanocomposite. The nanocomposite may contain 10±2.5, 2, 1.5, 1, 0.5, or 0.1 wt. % of graphite-phase carbon nitride (g-$C_3N_4$).

The nanocomposite may contain $MoO_3$ in an amount ranging from 2 to 7 wt. %, including 3 to 7 wt. %, 7 to 11 wt. %, 11 to 13 wt. %, 13 to 15 wt. %, and 15 to 17 wt. % based on the total weight of the nanocomposite. The nanocomposite may contain 5 wt. % of $MoO_3$.

The nanocomposite may contain magnesium aluminum oxide ($MgAl_2O_4$) in an amount ranging from 75 to 95 wt. %, including 80 to 82 wt. %, 82 to 84 wt. %, 84 to 86 wt. %, 86 to 88 wt. %, and 88 to 90 wt. % based on the total weight of the nanocomposite. The nanocomposite may contain 85±2.5, 2, 1.5, 1, 0.5, or 0.1 wt. % of magnesium aluminum oxide ($MgAl_2O_4$).

The nanocomposite may be porous. A porous material is the one that forms a porous bulk solid. Pores may be micropores, mesopores, macropores, and/or a combination thereof. The pores exist in the bulk material, not necessarily in the molecular structure of the material. The term 'microporous' means that nanocomposite have pores with an average pore width (i.e. diameter) of less than 2 nm, e.g., in a range with an upper limit of 2, 1, 0.9, 0.75, 0.5, 0.25, 0.1, 0.05, or 0.01 nm, and/or a lower limit of 0.00001, 0.0001, 0.001, 0.01, 0.1, 0.25, 0.5, 0.75, or 1 nm. The term 'mesoporous' means the pores of the nanocomposite have an average pore width of 2 to 50 nm, though this may include subranges within this general range, e.g., a minimum diameter of 2, 3, 5, 10, 15, 20, 25, or 35 m, and/or a maximum diameter of 50, 45, 40, 35, 30, 25, 20, 15, or 10 nm. The term 'macroporous' means the pores of nanocomposite have an average pore width larger than 50 nm, e.g., at least 55, 75, 100, 250, 500, 750, or 1000 nm. Pore size may be determined by methods including, but not limited to, gas adsorption (e.g. $N_2$ adsorption), mercury intrusion porosimetry, and imaging techniques such as scanning electron microscopy (SEM), and X-ray computed tomography (XRCT).

The Brunauer-Emmett-Teller (BET) surface area of the nanocomposite may be in a range of from 8 to 12 square meters per gram ($m^2/g$), preferably 9 to 11 $m^2/g$, and preferably 10 $m^2/g$. The surface area on the nanocomposite may be 10.1±2.5, 2, 1.5, 1, 0.75, 0.5, 0.25, 0.2, or 0.1 $m^2/g$. The BET hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

The average pore distribution of the nanocomposite may include, but is not limited to, crystalline average pore distribution, bimodal, trimodal, multimodal, narrow, broad, and Gaussian. The average pore distribution of nanocomposite may be unimodal, indicating a single dominant pore size within the material. This unimodal distribution suggests that the nanocomposites possess a relatively narrow pore size range, resulting in more uniform pore structures and enhancing specific properties such as adsorption capacity, catalytic activity, or surface reactivity.

The average pore diameter of the nanocomposite, according to Barrett-Joyner-Halenda (BJH) measurement method, may be in a range of from 5 to 15 nm, preferably 6 to 14 nm, preferably 7 to 13 nm, preferably 8 to 12 nm, and preferably 9 to 11 nm. The nanocomposite may have an average pore diameter of 8.34±2.5, 2, 1.5, 1, 0.5, 0.1, 0.05, 0.025, or 0.01 nm.

The average pore volume of the nanocomposite, according to the BJH measurement method, may be in a range of from 0.01 to 0.5 $cm^3/g$, preferably 0.02 to 0.4 $cm^3/g$, preferably 0.03 to 0.3 $cm^3/g$, preferably 0.04 to 0.2 $cm^3/g$, and preferably 0.05 to 0.1 $cm^3/g$. The average pore volume of the nanocomposite may be 0.033±0.1, 0.05, 0.025, or 0.01 $cm^3/g$.

The mass relationship of the nanocomposite may be in a range of from 9 to 11:4 to 6:84 to 86, and preferably 9.5 to 10.5:4.5 to 5.5:84.5 to 85.5. The mass relationship of the nanocomposite may be 10:5:85, wherein the ratios may vary by ±3, 2.5, 2, 1.5, 1, 0.5, 0.25, or 0.1.

The nanocomposite may have a (311) spinel interplanar spacing in a range of from 0.205 to 0.285 nm, preferably 0.215 to 0.275 nm, preferably 0.225 to 0.265 nm, and preferably 0.235 to 0.255 nm, according to selected area electron diffraction (SAED). The nanocomposite may include a (411) $MoO_3$ interplanar spacing in a range of from 0.150 to 0.230 nm, preferably 0.160 to 0.220 nm, preferably 0.170 to 0.210 nm, and preferably 0.180 to 0.200 nm, according to SAED. The nanocomposite may include a (511) spinel interplanar spacing in a range of from 0.115 to 0.195 nm, preferably 0.125 to 0.185 nm, preferably 0.135 to 0.175 nm, and preferably 0.145 to 0.165 nm, according to SAED. The nanocomposite may include a (311) MgO interplanar spacing in a range of from 0.087 to 0.167 nm, preferably 0.097 to 0.157 nm, preferably 0.107 to 0.147 nm, and preferably 0.117 to 0.137 nm, according to SAED. The nanocomposite may include a (622) spinel interplanar spacing in a range of from 0.080 to 0.160 nm, preferably 0.090 to 0.150 nm, preferably 0.100 to 0.140 nm, and preferably 0.110 to 0.130 nm, according to SAED.

The nanocomposite may have a (311) spinel interplanar spacing of 0.245±2% nm, (411) $MoO_3$ interplanar spacing of 0.19±2% nm, (511) spinel interplanar spacing of 0.155±2% nm, (311) MgO interplanar spacing of 0.127±2% nm, and/or (622) spinel interplanar spacing of 0.12±2% nm, according to SAED.

An XRD spectrum of the nanocomposite under Cu-filtered CuKα radiation (1.5418 Å) powered at 45 kilovolt (kV) and 10 milliampere (mA) may have 2θ peaks of an $MoO_3$ hexagonal phase at 18.7±1°, 28.7±1°, 33.0±1°, 33.8±1°, 36.8±1°, and/or 42.8±1°, an $MgAl_2O_4$ spinel phase at 19.3±1°, 36.8±1°, 44.6±1°, 59.3±1°, and/or 65.0±1°; an MgO cubic phase at 42.8±1°, 62.2±1°, and/or 74.6±1°; and/or g-$C_3N_4$-related diffractions at 27.8±1°, 36.8±1°, 44.6±1°, and/or 59.3±1°. No more than 1% relative intensity $Al_2O_3$ may be detected in the XRD spectrum. The minimal presence of $Al_2O_3$ (less than 1, 0.75, 0.67, 0.5, 0.33, 0.25, 0.125, 0.1, 0.05, 0.01, 0.001, or 0.0001%) in the nanocomposite is critical to maintaining its enhanced catalytic properties, high surface reactivity, and efficient adsorption. This ensures desired performance in environmental remediation, energy production, and biomedical applications, free from interference by less reactive $Al_2O_3$ phases.

The $MoO_3$ in the nanocomposite may have a hexagonal crystal structure. Alternatively or additionally, the $MoO_3$ may exist in other crystal phases including cubic, monoclinic, tetragonal, rhombohedral, and orthorhombic phases. The hexagonal phase of $MoO_3$ may be represented by diffractions at 2θ values of 18.7, 28.7, 33.0, 33.8, 36.8, and/or 42.8°. At 2θ values of 42.8, 62.2, and/or 74.6°, the cubic phase of MgO is detected. At 2θ values of 19.3, 36.8, 44.6, 59.3, and/or 65.01°, $MgAl_2O_4$ spinel is detected. At 2θ values of 27.8, 36.8, 44.6, and/or 59.3° g-$C_3N_4$-related diffractions may be detected.

The $MgAl_2O_4$ may have a spinel phase. The spinel phase is a mixed oxide with the general formula $AB_2O_4$, including one divalent cation ($A^{2+}$) and two trivalent cations ($B^{3+}$). The unit cell consists of a face-centered cubic arrangement of oxygen ions, containing 32 $O^{2-}$-ions, with 64 tetrahedral and 32 octahedral sites occupied by $A^{2+}$ and $B^{3+}$ cations. When one half of the octahedral interstices are occupied by $B^{3+}$ cations and one-eighth of the tetrahedral sites are occupied by $A^{2+}$ cations, the spinel phase is termed "normal." Conversely, when tetrahedral sites are occupied by half of the $B^{3+}$ and octahedral sites by the other half along with $A^{2+}$, the spinel phase is termed "inverse."

The spinel phase with the chemical formula $MgAl_2O_4$ is a mineral type of this oxide family. $MgAl_2O_4$ has been widely used in various applications, such as in metallurgical, electrochemical, radio-technical, and chemical industrial fields owing to its high thermal stability (melting point at 2135° C., high hardness (16 gigapascal (GPa)), high mechanical resistance, high resistance against chemical attack, wide band gap energy, high electrical resistivity, relatively low thermal expansion coefficient ($9.10^{-6}$ $^1$/° C.) between 3° and 1400° C., low dielectric constant, low density (3.58 gram per cubic centimeter (g/cm$^3$)), high thermal shock resistance, hydrophobicity, and low surface acidity.

The nanocomposite may include no more than 1, 0.5, 0.1, 0.01, 0.001, 0.0001, or 0.00001 wt. % $MoS_2$ and/or $SnS_2$. The nanocomposite may include no $MoS_2$ and/or $SnS_2$, or no sulfide altogether (e.g., added sulfide). The nanocomposite obtained may include no $MoS_2$ and/or $SnS_2$, or may exclude added $MoS_2$ and/or $SnS_2$, such as no detectable amounts thereof by, e.g., combustion analysis and/or spectroscopic analysis (e.g., UV-vis, fluorescence, XPS, IR, ESR, etc.). The nanocomposite obtained may include no sulfide, exclude added sulfide or metal sulfide, such as no detectable amounts thereof by, e.g., combustion analysis and/or spectroscopic analysis (e.g., UV-vis, fluorescence, XPS, IR, ESR, etc.). The nanocomposite obtained may include no sulfide, particularly no added $Mo_2S$ and/or sulfide. The nanocomposite may include no more than 0.1, 0.01, 0.001, or 0.0001 wt. % $Mo_2S$, $SnS_2$, and/or sulfide, e.g., no detectable $Mo_2S$, $SnS_2$, and/or sulfide, based on total nanocomposite weight.

The nanocomposite may include less than 0.1 wt. % Co, preferably less than 0.09 wt. % Co, preferably less than 0.08 wt. % Co, preferably less than 0.07 wt. % Co, preferably less than 0.06 wt. % Co, preferably less than 0.05 wt. % Co, preferably less than 0.04 wt. % Co, preferably less than 0.03 wt. % Co, preferably less than 0.02 wt. % Co, and preferably less than 0.01 wt. % Co, relative to total nanocomposite weight. The nanocomposite obtained may include no added Co, e.g., only inevitable traces.

The exclusion of $MoS_2$, sulfide, and the minimization of Co, content in the nanocomposite can help preserve its desired catalytic properties, stability, and reactivity. The absence of $MoS_2$ and sulfide may prevent undesirable side reactions, while limiting the Co content to less than 0.1 wt. % may prevent interference and potential toxicity, thereby enhancing the performance and applicability of the nanocomposite.

The nanocomposite may include less than 0.1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.09 wt. %, preferably less than 0.06 wt. %, preferably less than 0.04 wt. %, preferably less than 0.01 wt. % Bi, relative to total nanocomposite weight. The nanocomposite may include no bismuth.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % tin, relative to total nanocomposite weight.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % potassium and/or zinc, individually or together.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % iron and/or nickel, individually or together.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % of iron, cobalt, nickel, and/or copper, individually or in any combination.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % Mo (IV). The nanocomposite may include at least 99 wt. %, preferably 99.2 wt. %, preferably 99.4 wt. %, preferably 99.5 wt. %, preferably 99.6 wt. %, preferably 99.7 wt. %, preferably 99.8 wt. %, preferably 99.9 wt. % of Mo (VI).

The nanocomposite may include no more than 1 wt. % of carbonaceous material, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % of carbonaceous material besides the graphitic carbon nitride. A low concentration of carbonaceous material may contribute to maintaining the desired structural integrity and functional properties of the nanocomposite. The minimal amount of additional carbon material can prevent significant interference with the performance of the graphitic carbon nitride, particularly in applications such as photocatalysis or energy storage, where the purity and specific properties of the g-$C_3N_4$ are crucial.

The nanocomposite may include no more than 5 wt. % graphene, preferably less than 4 wt. %, preferably less than 3 wt. %, preferably less than 2 wt. %, preferably less than 1 wt. %, preferably less than 0.5 wt. %, preferably less than 0.1 wt. % of graphene relative to all carbonaceous material in the nanocomposite.

The nanocomposite may consist essentially of sheet morphologies, preferably nanosheets, i.e., such that the hydrogen generation efficiency is no more than 2% different from an otherwise identical system using pure nanosheet morphology. Although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars, tetrapods, and their mixtures thereof are also possible, alternatively or in addition. The nanocomposite may have a structure including a dispersion of homogeneous spherical metal oxide nanoparticles on a two-dimensional porous structure, including curled and wrinkled nanosheets and platelets of the g-$C_3N_4$.

The nanocomposite obtained may include no more than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % of elemental metal. Excessive metal accumulation could negatively impact the nanocomposite's stability, reactivity, or selectivity. By limiting the metal content, the nanocomposite may maintain a high level of performance in its intended applications, ensuring that the active sites of the carrier material remain unblocked or inhibited, thus enhancing its long-term durability, minimizing unwanted side reactions, and preserving its efficiency in processes like catalysis or energy conversion.

The nanocomposite may include no more than 1 wt. %, preferably less than 0.9 wt. %, preferably less than 0.8 wt. %, preferably less than 0.7 wt. %, preferably less than 0.6 wt. %, preferably less than 0.5 wt. %, preferably less than 0.4 wt. %, preferably less than 0.3 wt. %, preferably less than 0.2 wt. %, preferably less than 0.1 wt. %, preferably less than 0.05 wt. %, and preferably less than 0.01 wt. % of $Ba(OH)_2$.

The minimal presence or absence of each of these elements/compounds, in aforementioned embodiments, in the nanocomposite ensures desired performance in environmental remediation, energy production, and biomedical applications, free from interference by other phases in the nanocomposite.

A method of hydrogen generation using the nanocomposite may include contacting sodium borohydride ($NaBH_4$) and a nanocomposite including graphitic $C_3N_4$, $MoO_3$, and $MgAl_2O_4$ in a mass relationship to each other in a range of from 5 to 15:2 to 7:75 to 95, at a temperature in a range of from 10 to 80° C., thereby catalyzing the hydrogen generation at a hydrogen generation rate in a range of from 2750 to 6000 L/(min·g).

The method of contacting (e.g., sodium) borohydride with water in the presence of the nanocomposite may be performed at a temperature range of 20 to 70° C., preferably 25 to 65° C., preferably 30 to 60° C., preferably 35 to 55° C., preferably 40 to 50° C., preferably 40 to 45° C., more preferably at about 40° C. for a period of 1 to 60 minutes, preferably 5 to 10 minutes.

Other borohydride salts such as lithium borohydride, potassium borohydride, calcium borohydride, magnesium borohydride, aluminum borohydride, zinc borohydride, barium borohydride, cesium borohydride, rubidium borohydride, strontium borohydride, tetrabutylammonium borohydride, ammonium borohydride, trimethylammonium borohydride, benzyltrimethylammonium borohydride, potassium tetraphenylborate, lithium tetrafluoroborate, potassium tetrafluoroborate, sodium tetrafluoroborate, copper borohydride, nickel borohydride, iron borohydride, lead borohydride, copper (II) borohydride, thallium borohydride, gold borohydride, silver borohydride, rhodium borohydride, palladium borohydride, antimony borohydride, and/or combinations thereof may be used alternatively or in addition.

The hydrogen may be generated at a hydrogen generation rate ranging from 3500 to 5000 mL/min per gram, with specific intervals of 3750 to 4750 mL/min per gram, 3800 to 4500 ml/min per gram, 3900 to 4400 mL/min per gram, 4000 to 4200 mL/min per gram, 4000 to 4100 mL/min per gram of the nanocomposite. Hydrogen may be generated at a hydrogen generation rate of 4000 mL/min per gram of the nanocomposite.

Contacting the sodium borohydride with water in the presence of the nanocomposite generates 2 to 8-fold more hydrogen than contacting the sodium borohydride with water in the absence of the nanocomposite after 5 minutes. The borohydride may be sodium, lithium, magnesium, potassium, or a mixture of these. The borohydride may also contain cyanide, e.g., $Na[BH_3(CN)]$.

The following examples are provided solely for illustration and are not to be construed as limitations of the present disclosure, as many variations thereof are possible without departing from the spirit and scope of the present disclosure.

EXAMPLES

The following examples demonstrate a method of hydrogen generation via a nanocomposite as synthesized herein. The examples are provided solely for illustration and are not to be construed as limitations of the present disclosure, as many variations thereof are possible without departing from the spirit and scope of the present disclosure.

Example 1: Fabrication of g-$C_3N_4$@$MoO_3$/ $MgAl_2O_4$ (10:5:85, wt. %) nanocomposite Magnesium nitrate, and aluminum nitrate were added together in one beaker with ammonium molybdate amounts proper (here, stoichiometric) to produce a 10% $MoO_3$@$MgAl_2O_4$. About 10 g of dextrose as fuel was added to the beaker, followed by 30 mL of distilled water. The beaker was heated till a clear solution was obtained, then heated further till dryness. The product was ground in a mortar, transferred to a 150 mL porcelain dish, and calcined at 700° C. for 3.0 hours. Then after, the 10% $Mo_{03}$@$MgAl_2O_4$ product was cooled down to room temperature and weighed, then ground with urea amount suitable (here, 2 g urea per 20 g 10% $MoO_3$/$MgAl_2O_4$, but depending upon the reaction conditions, this may be 5, 10, 15, 20, 25, 33, 50, 100, 150, 250, 500, or 1000 parts by weight of urea to 100 parts by weight of 10% $MoO_3$/ $MgAl_2O_4$, and optionally no more than 100,000, 50,000, 25,000, 10,000, 5,000, 1,000, 750, 500, 400, 333, 250, 125, 100, 75, 50, or 25 parts by weight urea to 100 parts) to produce g-$C_3N_4$@$MoO_3$/$MgAl_2O_4$ (10:5:85, wt. %) nanohybrid. The quadruple mixture was returned and heated to 600° C. for 40.0 min in a covered porcelain crucible and cooled to room temperature; then after, the g-$C_3N_4$@$MoO_3$/ $MgAl_2O_4$ (10:5:85, wt. %) nanohybrid was collected.

Results and Discussion

The crystallinity and phases identification present in $MoO_3$/$MgAl_2O_4$/g-$C_3N_4$ catalyst was analyzed by XRD and the results are given in FIG. 1. The intense peaks show that the powders are high crystalline. Matching of the diffraction patterns with the standard JCPDS cards reveals the presence of $MoO_3$, MgO, $MgAl_2O_4$, and g-$C_3N_4$ phases. Diffractions at 2θ values of 18.7, 28.7, 33.0, 33.8, 36.8, 42.8° are corresponding to the hexagonal phase of $MoO_3$ (JCPDS No. 00-021-0569). Cubic phase of MgO (JCPDS card, No. 45-0946) was observed at 2θ values of 42.8, 62.2, and 74.6°. $MgAl_2O_4$ spinel was found at 2θ values of 19.3, 36.8, 44.6, 59.3, and 65.01°. These diffractions are assigned to the cubic phase of $MgAl_2O_4$ spinel (JCPDS card, No. 21-1152). The presence of MgO together with the $MgAl_2O_4$ spinel phase was also previously reported, as described by Kumar et al. in *Sust. Energy Techn. Assess.* 2023, 55, 102905. The diffractions related to g-$C_3N_4$ was observed at 27.8, 36.8, 44.6, and 59.3°. No other phases were detected (like $Al_2O_3$) indicating the successful fabrication of $MoO_3$/$MgAl_2O_4$/g-$C_3N_4$.

Figure 2A:
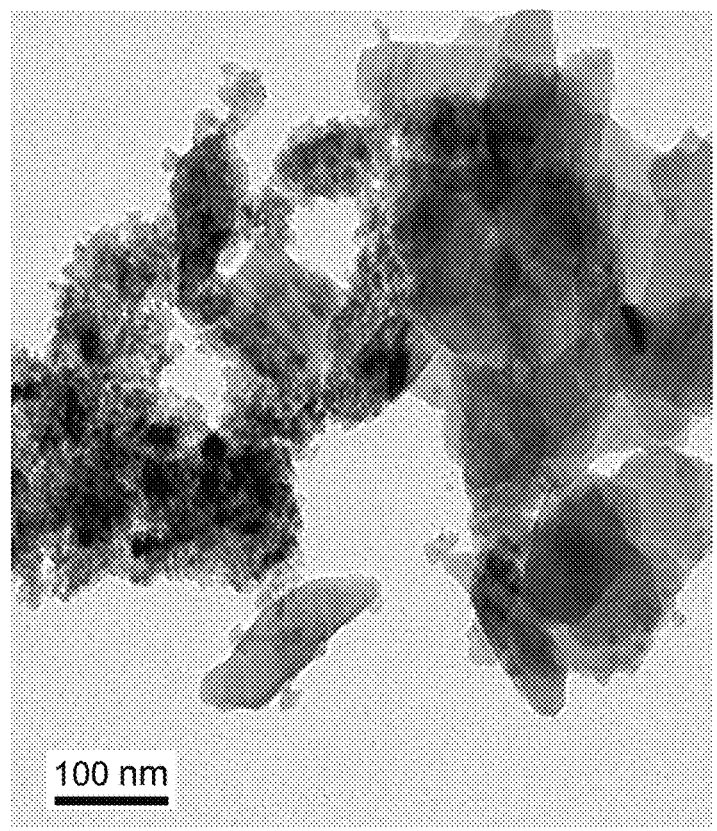
FIG. 2A show transmission electron microscopy (TEM) images of an inventive 10% g-$C_3N_4$@$MoO_3$/$MgAl_2O_4$ nanocomposite.
Figure 2B:
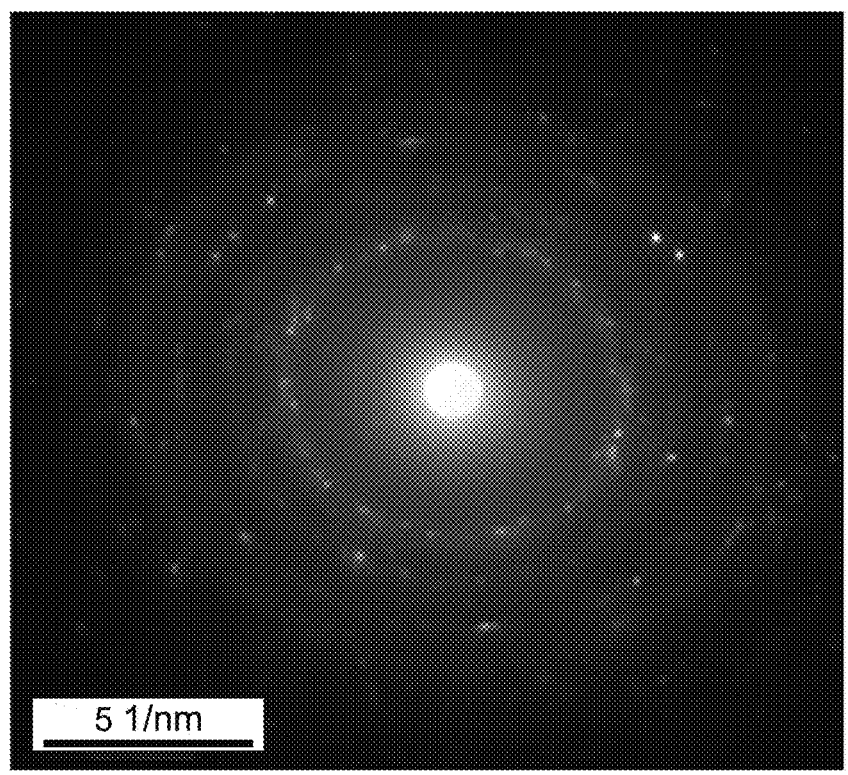
FIG. 2B is a high-resolution transmission electron microscopy (HRTEM) image of an inventive 10% g-$C_3N_4$@$MoO_3$/$MgAl_2O_4$ nanocomposite.
Figure 2C:
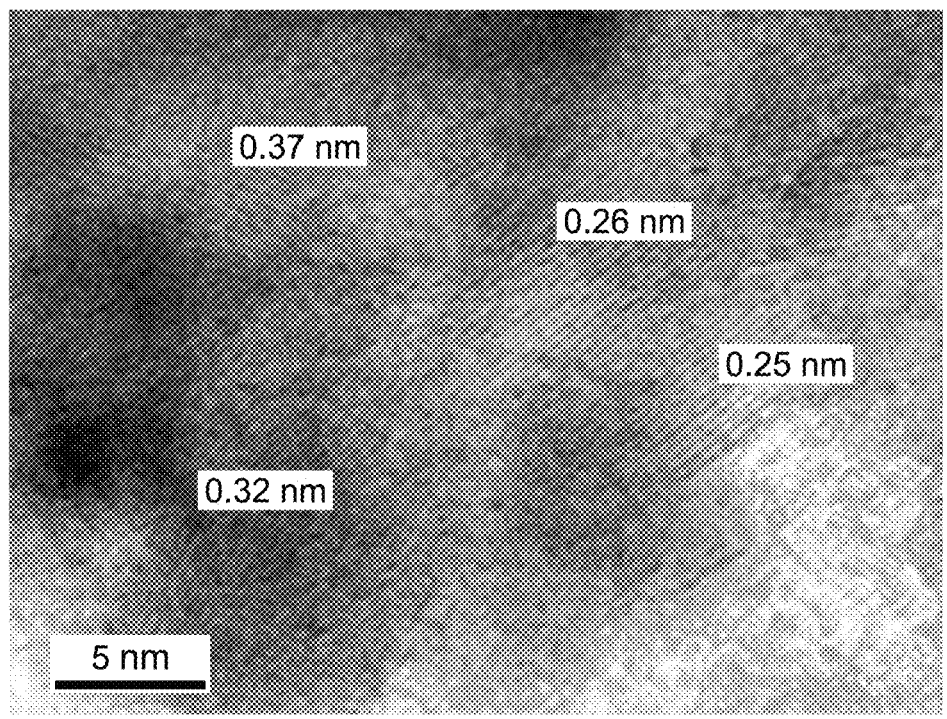
FIG. 2C is a selected area electron diffraction (SAED) pattern of an inventive 10% g-$C_3N_4$@$MoO_3$/$MgAl_2O_4$ nanocomposite.
Figure 2D:
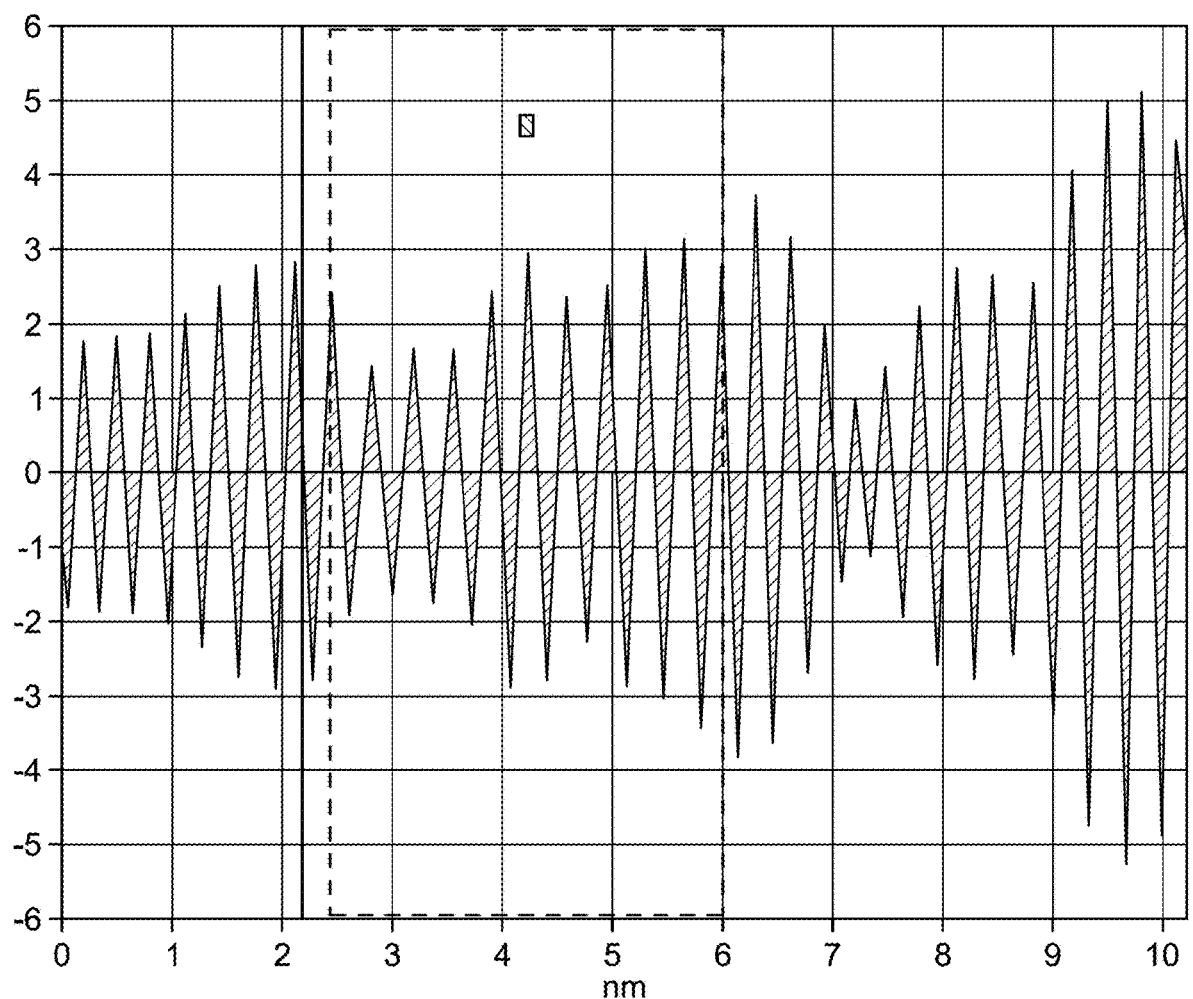
FIG. 2D shows fast Fourier transform (FFT) pattern of an inventive 10% g-$C_3N_4$@$MoO_3$/$MgAl_2O_4$ nanocomposite.
Figure 2E:
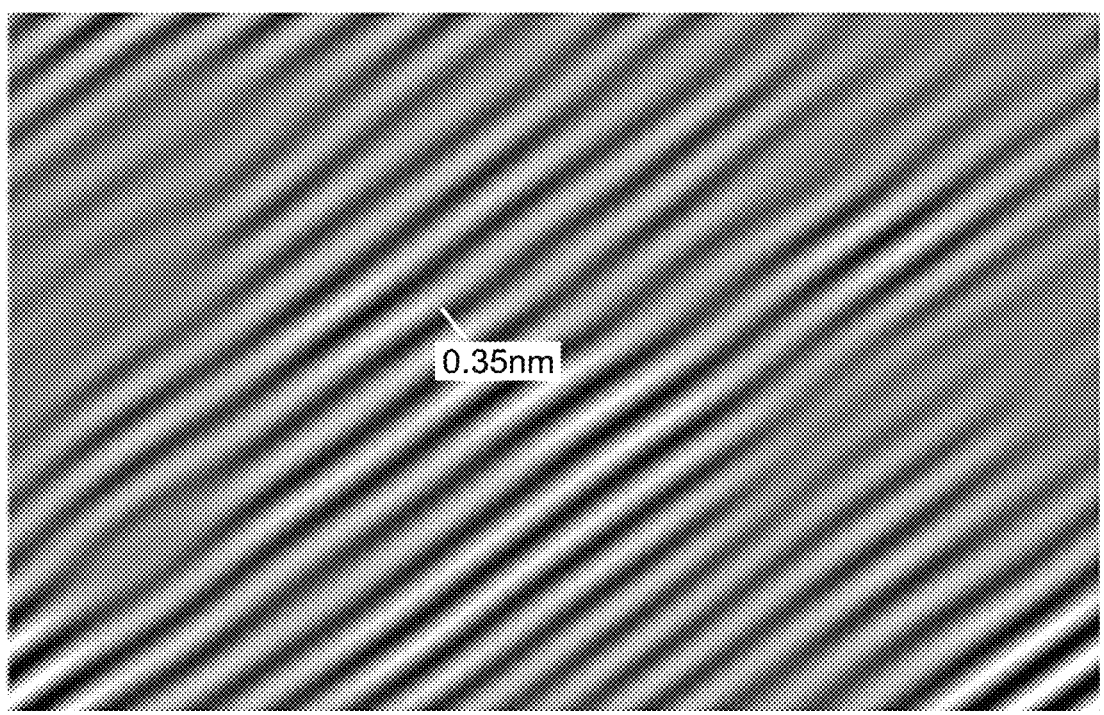
FIG. 2E shows inverse fast Fourier transform (IFFT) of an inventive 10% g-$C_3N_4$@$MoO_3$/$MgAl_2O_4$ nanocomposite.

TEM images of g-$C_3N_4$@$MoO_3$/$MgAl_2O_4$ nanocomposite were presented in FIG. 2A. The TEM images showed that well dispersion of homogeneous spherical metal oxides nanoparticles with size 9.4 nm on a two-dimensional porous structure constructed with curled and wrinkled nanosheets and platelets of the g-$C_3N_4$ (FIG. 2A). The corresponding SAED pattern reveals diffraction spots with an interplanar spacing of 0.245 nm, 0.19 nm, 0.155 nm, 0.127 nm, 0.12 nm due to (311, spinel), (411, $MoO_3$) and (511, spinel), (311, MgO), and (622, spinel) diffraction planes (FIG. 2B). The corresponding HRTEM of the composite shows a plane spacing of 0.34 nm related to the (002) of CN, where 0.25 nm and 0.24 nm related to (311) planes of spinel as well as (410) of $MoO_3$, and 0.32 nm related to (210) plane of $MoO_3$, characterizing the heterostructure formation (FIG. 2C). The FFT and IFFT measurements show a d value of 0.35 nm given to g-$C_3N_4$@$MoO_3$/$MgAl_2O_4$ nanocomposite, signifying the lattice spacing of (002), indicating the development of g-$C_3N_4$ structure (FIG. 2D and FIG. 2E).

Figure 3:
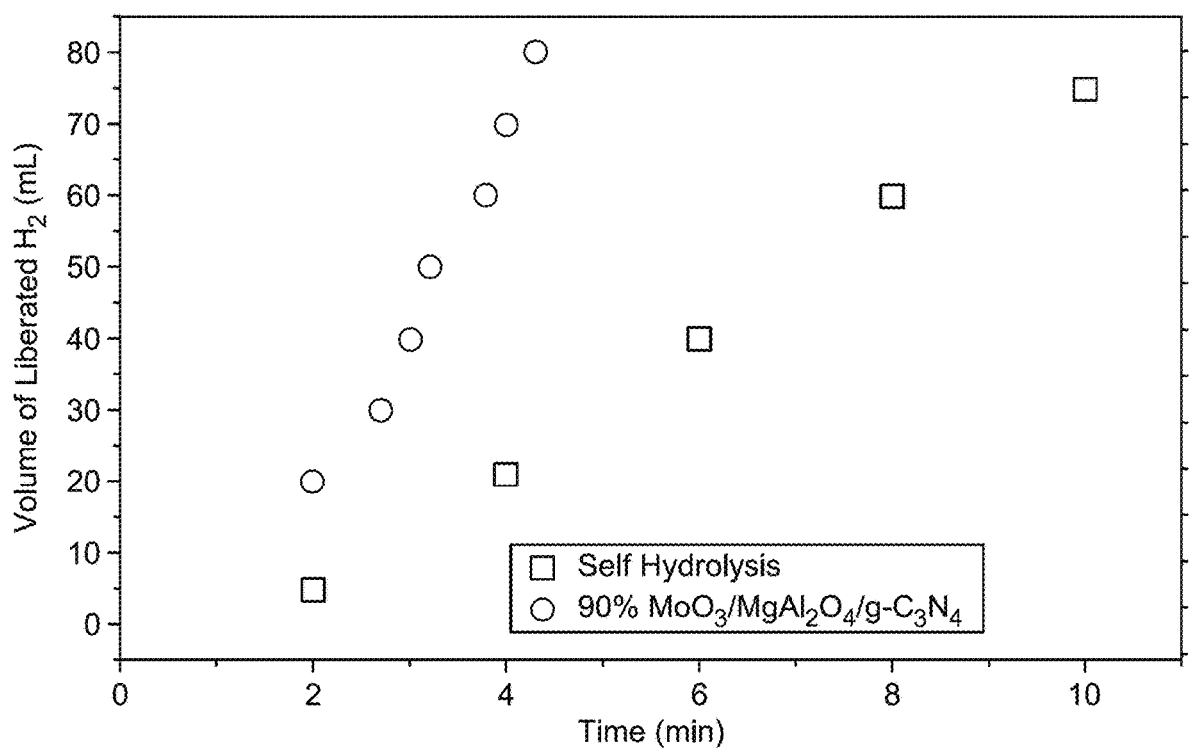
FIG. 3 shows the variation of volume of liberated $H_2$ with reaction time over an inventive g-$C_3N_4$@$MoO_3$/$MgAl_2O_4$ (10:5:85, wt %) nanocomposite at a temperature of 40° C.

The aspects of the present disclosure describe a g-$C_3N_4$@$MoO_3$/$MgAl_2O_4$ as a catalyst with a high hydrogen generation rate (HGR) that can hydrolyze sodium borohydride into pure, clean hydrogen ($H_2$) in a matter of minutes. It was made with inexpensive materials and was easily manufactured. A low-weight, stable, and safe hydrogen storage material with a high hydrogen storage capacity of 10.8 weight percent is sodium borohydride ($NaBH_4$). Hydrogen ($H_2$) has become one of the most remarkable energy carriers among renewable sources due to its high energy density (120 MJ/kg), non-toxicity, and environmental friendliness. Here, a nanocomposite, $MoO_3$/$MgAl_2O_4$/g-$C_3N_4$, which has a high hydrogen production rate and can hydrolyze sodium borohydride into pure and clean hydrogen in a matter of minutes. FIG. 3 displays the hydrolysis of $NaBH_4$ at a reaction temperature of 40° C. both with and without a catalyst. The prepared composite demonstrated catalytic activity greater than the self-hydrolysis process, demonstrating the manufactured catalyst's catalytic action, which was plainly visible. The results further show that the catalyst offers an HGR of 4000 mL min$^{-1}$ g$^{-1}$ at a temperature of 40° C.

Numerous modifications and variations of the present disclosure are possible in light of the above teachings. It is therefore to be understood that within the scope of the appended claims, the invention may be practiced otherwise than as specifically described herein.

The invention claimed is:

1. A method of hydrogen generation, the method comprising:
    reacting sodium borohydride with water in the presence of a catalyst comprising a nanocomposite comprising graphitic $C_3N_4$, $MoO_3$, and $MgAl_2O_4$ in a mass relationship to each other in a range of from 5 to 15:2 to 7:75 to 95, at a temperature in a range of from 10 to 80° C., thereby catalyzing the hydrogen generation at a hydrogen generation rate in a range of from 2750 to 6000 mL of $H_2$/(min·g of the nanocomposite),
    wherein the nanocomposite has a particle size in a range of from 1 to 500 nm.

2. The method of claim 1, wherein an average the average pore distribution of the nanocomposite is unimodal, and
    wherein a BET specific surface area of the nanocomposite is in a range of from 8 to 12 m$^2$/g, and/or
    wherein an average pore diameter of the nanocomposite, according to BJH measurement method, is in a range of from 5 to 15 nm, and/or
    wherein an average pore volume of the nanocomposite, according to the BJH measurement method, is in a range of from 0.01 to 0.5 cm$^3$/g.

3. The method of claim 1, wherein the nanocomposite has a (311) spinel interplanar spacing in a range of from 0.205 to 0.285 nm, (411) $MoO_3$ interplanar spacing in a range of from 0.150 to 0.230 nm, (511) spinel interplanar spacing in a range of from 0.115 to 0.195 nm, (311) MgO interplanar spacing in a range of from 0.087 to 0.167 nm, and (622)

spinel interplanar spacing in a range of from 0.080 to 0.160 nm, according to selected area diffraction.

4. The method of claim 1, wherein the mass relationship in the nanocomposite of the graphitic $C_3N_4$, $MoO_3$, and $MgAl_2O_4$ to each other of the nanocomposite is in a range of from 9 to 11:4 to 6:84 to 86,
wherein the nanocomposite has a (311) spinel interplanar spacing of 0.245±2% nm, (411) $MoO_3$ interplanar spacing of 0.19±2% nm, (511) spinel interplanar spacing of 0.155±2% nm, (311) MgO interplanar spacing of 0.127±2% nm, and (622) spinel interplanar spacing of 0.12±2% nm, according to selected area diffraction,
wherein an XRD spectrum of the nanocomposite under Cu-filtered CuKα radiation (1.5418 Å) powered at 45 kV and 10 mA has 2θ peaks of
an $MoO_3$ hexagonal phase at 18.7±1, 28.7±1, 33.0±1, 33.8±1, 36.8±1, and 42.8±1°,
an $MgAl_2O_4$ spinel phase at 19.3±1, 36.8±1, 44.6±1, 59.3±1, and 65.01±1°,
an MgO cubic phase at 42.8±1, 62.2±1, and 74.6±1°,
g-$C_3N_4$-related diffractions at 27.8±1, 36.8±1, 44.6±1, and 59.3±1°, and
wherein no more than 1% relative intensity $Al_2O_3$ is detected in the XRD spectrum.

5. The method of claim 1, wherein the hydrogen generation rate in the reacting is in a range of from 3750 to 5250 mL/(min·g), and
wherein the hydrogen generation rate in the reacting is in a range of from 2 to 8-fold that as compared to a same reaction without using the nanocomposite.

6. The method of claim 1, wherein the nanocomposite obtained comprises no more than 1 wt. % $MoS_2$ and $SnS_2$.

7. The method of claim 1, wherein the nanocomposite comprises no sulfide.

8. The method of claim 1, wherein the nanocomposite comprises no more than 0.1 wt. % of Bi.

9. The method of claim 1, wherein the nanocomposite comprises less than 0.1 wt. % Co, relative to total nanocomposite weight.

10. The method of claim 1, wherein the nanocomposite obtained comprises no added Co, and/or
wherein the nanocomposite obtained comprises no more than 1 wt. % tin.

11. The method of claim 1, wherein the nanocomposite obtained comprises no more than 1 wt. % potassium and zinc.

12. The method of claim 1, wherein the nanocomposite obtained comprises no more than 1 wt. % iron and nickel.

13. The method of claim 1, wherein the nanocomposite obtained comprises no more than 1 wt. % Mo (IV), and/or
wherein the nanocomposite obtained comprises at least 99 wt. % Mo (VI).

14. The method of claim 1, wherein the nanocomposite obtained comprises no more than 1 wt. % carbonaceous material besides the graphitic carbon nitride, and/or
wherein the nanocomposite comprises no more than 5 wt. % graphene, relative to all carbonaceous material in the nanocomposite.

15. The method of claim 1, wherein the nanocomposite has a structure comprising a dispersion of homogeneous spherical $MoO_3$—$MgAl_2O_4$ nanoparticles on a two-dimensional porous structure nanosheets and platelets of the graphitic $C_3N_4$.

16. The method of claim 1, wherein the nanocomposite comprises no bismuth.

17. The method of claim 1, wherein the nanocomposite comprises no more than 1 wt. % of iron, cobalt, nickel, and/or copper.

18. The method of claim 15, wherein the nanosheets are curled and/or wrinkled.

19. The method of claim 1, wherein the nanocomposite comprises no more than 1 wt. % $Ba(OH)_2$.

* * * * *